Sept. 20, 1955       A. SIMKO, SR       2,718,238

FLOOD PROTECTING BACK WATER TRAP

Filed Aug. 13, 1952       2 Sheets-Sheet 1

INVENTOR.

Andrew Simko, Sr.

BY *Victor J. Evans & Co.*

ATTORNEYS

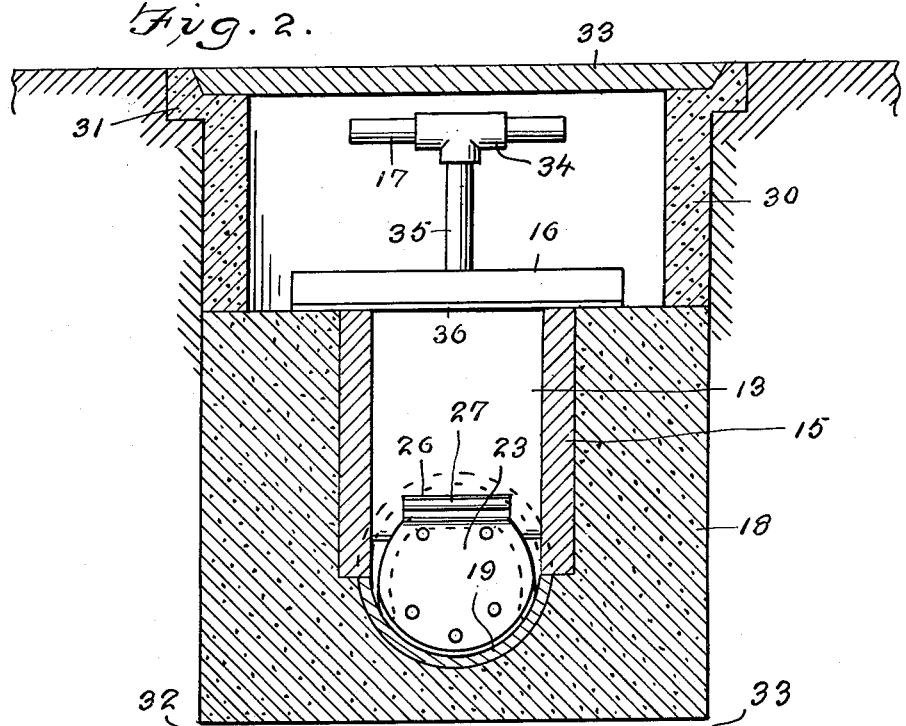
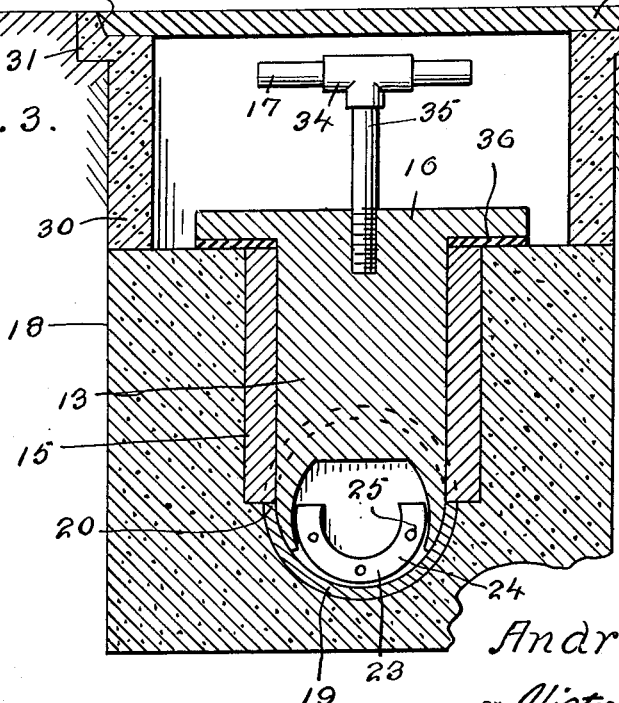
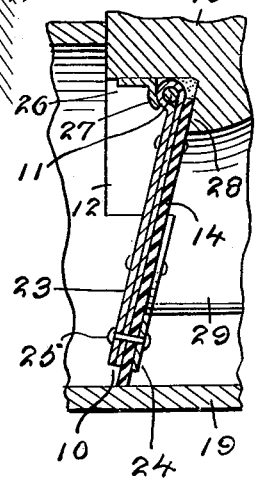

United States Patent Office 2,718,238
Patented Sept. 20, 1955

2,718,238

FLOOD PROTECTING BACK WATER TRAP

Andrew Simko, Sr., Vandergrift, Pa.; Anna Simko, administratrix of said Andrew Simko, Sr., deceased Application August 13, 1952, Serial No. 304,185

1 Claim. (Cl. 137—527.2)

This invention relates to traps or valves used in sewer connections and the like where it is undesirable to have water or other fluid back up in the connection, and in particular a gate valve having a hinged valve element, providing a check valve whereby fluid flowing in one direction elevates the valve member to permit passage of the fluid and fluid flowing in the opposite direction closes the said valve member.

The purpose of this invention is to provide a trap or valve adapted to be positioned in a connection such as the connection from a building to a sewer wherein water is free to flow in one direction, however, when the water level on the discharge side of the device rises, due to floods and the like the device is closed by the water whereby passing of the water back into the building is prevented.

In numerous instances such as in sewer connections from buildings or basements of buildings it is not desired to use a conventional check valve and with this thought in mind this invention contemplates a valve or trap of the flap type wherein a plate connected by a hinge to a slidably mounted stem falls into the closed position by gravity wherein with the plate slightly inclined a positive closure is provided when water or other liquid attempts to back up through the connection.

The object of this invention is, therefore, to provide means for forming a check valve or gate whereby the device is adapted to be installed in a sewer connection of a building or the like, to prevent water backing up through the connection.

Another object of the invention is to provide a device for preventing water backing up through a connection in which the parts are readily removable and replaceable.

A further object of the invention is to provide a check valve for drain connections from buildings to sewers and the like in which the device is of a simple and economical construction.

With these and other objects and advantages in view the invention embodies a valve body having a vertically disposed opening, rectangular shaped in cross section, extended upwardly from a tubular passage through the body with a sleeve providing a lining in the opening, with a rectangular shaped member providing a valve stem slidably mounted in the sleeve and having a head with a handle extended from the upper surface thereof on the upper end, and a plate hinged to the lower end of the stem and having a covering sheet of resilient material and also reinforcing elements thereon.

Other features and advantages of the invention will appear from the following description taken in connection with the drawings, wherein:

Figure 2 is a cross section through the device taken on line 2—2 of Fig. 1.

Figure 3 is a cross section similar to that shown in Fig. 2 taken on line 3—3 of Fig. 1.

Figure 7 is a longitudinal section through the valve elements showing the parts on an enlarged scale and illustrating the plate pivotally mounted in the lower end of the valve stem.

Figure 1:
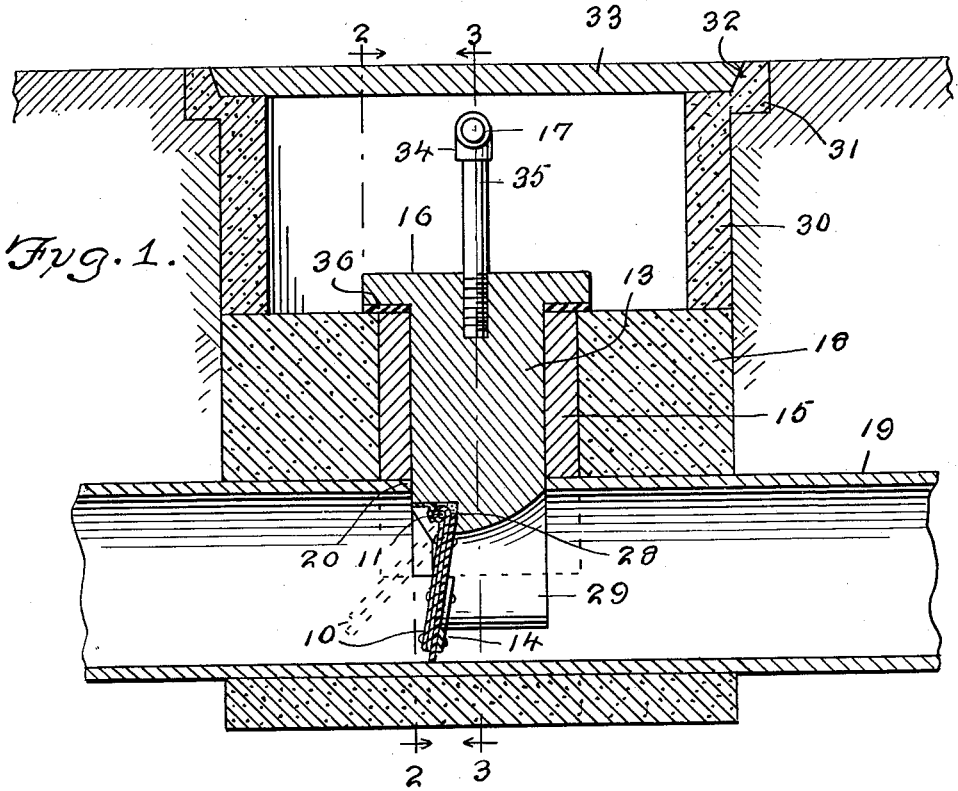
Figure 1 is a longitudinal section through the trap.
Figure 4:
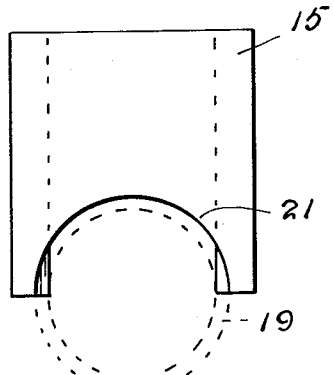
Figure 4 is a detail showing an end elevational view of the sleeve in which the valve stem is mounted and showing the sleeve positioned on a tube or pipe.
Figure 5:
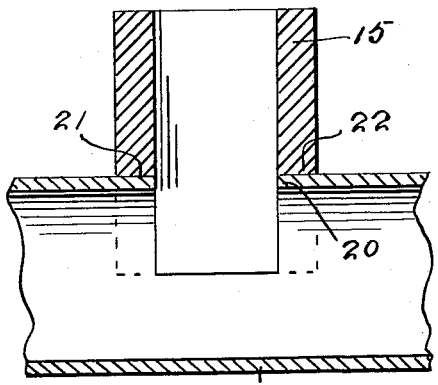
Figure 5 is a longitudinal section through the pipe and sleeve with the parts in the position shown in Fig. 4.
Figure 6:
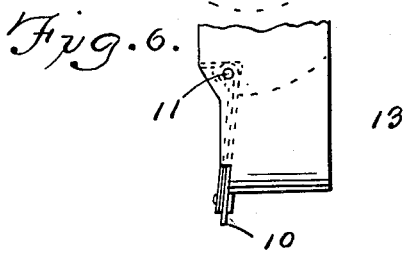
Figure 6 is a detail illustrating the lower end of the valve stem and illustrating the position of the valve plates therein.

Referring now to the drawings wherein like reference characters denote corresponding parts the improved flood protecting back water trap or check valve of this invention includes a plate 10 pivotally mounted by a pin 11 in a socket 12 of a valve stem 13 with one side of the plate covered with a sheet 14 of rubber or other suitable resilient material and with the stem 13 mounted in a sleeve 15 and having a head 16 on the upper end from which a handle 17 extends.

This valve or trap, which is particularly adapted for preventing water backing up into basements of buildings from sewers and the like is installed in a body 18 through which a pipe 19 extends and the upper side of the tube or pipe 19 is provided with an opening 20 through which the lower end of the valve stem 13, which is rectangular shaped in cross section extends. The valve stem extends through the sleeve 15 which is provided with arcuate surfaces 21 and 22 that nest on the upper surface of the pipe or tube 19.

The pocket 12 in which the plate 10 is pivotally mounted by the pin 11 is positioned in the lower end of the valve stem 13 and, as illustrated in Fig. 7, the upper end of the plate 10 extends around the pin 11 with a similar section 23 thereof covering one side of the plate and, as illustrated in Fig. 7 the opposite side of the plate is covered with a sheet 14 of rubber or other similar resilient material. The lower part of the plate is reinforced with a substantially semi-circular ring 24, the ring, resilient plate and sections of the plate 10 being secured together with bolts 25. A guard plate 26 having an arcuate flange 27 extended therefrom is positioned over the forward part of the plate.

The lower end of the stem 13 is also provided with a shoulder 28 and an opening 29 is provided in the rear portion of the stem below the shoulder, as shown in Figs. 1 and 7.

A section 30 having side and end walls is positioned on the body 18 and a flange 31 extended around the upper edge of the section 30 is provided with a continuous recess 32 in which a cover plate 33 may be positioned.

The handle 17 is formed with a T 34 on the upper end of a tube 35 that is threaded into the stem 13, as shown in Fig. 1.

The trap is also provided with a gasket 36 that is positioned between the head 16 and the upper end of the sleeve 15 whereby the area around the stem is sealed.

With the parts arranged in this manner the device of this invention is installed in an outlet connection, such as from a basement or other part of a building to a sewer and with the parts positioned as illustrated in Fig. 1 water or the like may flow from the right to the left whereas should the water back up the valve member or plate 10 drops downwardly to the position shown in Fig. 1 preventing water flowing from the left to the right.

It will be understood that modifications, within the scope of the appended claim, may be made in the design and arrangement of the parts without departing from the spirit of the invention.

What is claimed is:

In a flood protecting back water trap, a valve body provided with a longitudinally disposed bore extended horizontally therethrough, a horizontally disposed conduit extending through said bore and provided with an opening at the upper end theerof, said body having a vertically positioned opening the lower end of which communicates with the bore therein, a sleeve positioned in said vertically disposed opening, the lower edge of said sleeve having arcuate formations to engage and conform with the contour of said conduit, a valve stem positioned in said sleeve and having its lower end extended into the bore in said body, the lower end of said stem projecting into the opening in said conduit, there being a recess in the lower end of said stem defining a shoulder, a pin positioned in the lower portion of said stem, a plate arranged contiguous to said shoulder and including an upper curved portion extending around said pin, said plate including a pair of superposed sections, a sheet of resilient material secured to one side of said plate, a semi-circular ring arranged contiguous to the lower portion of said sheet and secured thereto, an enlarged head on the upper end of said stem arranged contiguous to the top of said sleeve, a gasket interposed between said head and sleeve and a T-shaped handle extending upwardly from said stem and secured thereto.

References Cited in the file of this patent
UNITED STATES PATENTS

| | | |
|---|---|---|
| 139,878 | Dame | June 17, 1873 |
| 274,204 | Lawson | Mar. 20, 1883 |
| 1,099,069 | Matthews | June 2, 1914 |
| 1,379,389 | Brasington | May 24, 1921 |
| 1,699,954 | Connell | Jan. 22, 1929 |
| 1,733,276 | Porter | Oct. 29, 1929 |
| 1,757,823 | Wray | May 6, 1930 |
| 1,860,289 | Johnson | May 24, 1932 |
| 1,953,358 | Mantz | Apr. 3, 1934 |
| 2,331,602 | Edwards | Oct. 12, 1943 |
| 2,347,544 | Costa | Apr. 25, 1944 |
| 2,578,076 | Kirby | Dec. 11, 1951 |
| 2,608,203 | Butler | Aug. 26, 1952 |
| 2,676,604 | Senna | Apr. 27, 1954 |